Aug. 23, 1932.  A. G. STEINMAYER  1,873,497

POT HEAD

Filed Oct. 4, 1928

Inventor
Alwin G. Steinmayer
By Ira Milton Jones
Attorney

Patented Aug. 23, 1932

1,873,497

UNITED STATES PATENT OFFICE

ALWIN G. STEINMAYER, OF MILWAUKEE, WISCONSIN, ASSIGNOR, BY MESNE ASSIGNMENTS, TO LINE MATERIAL COMPANY, OF SOUTH MILWAUKEE, WISCONSIN, A CORPORATION OF DELAWARE

POT HEAD

Application filed October 4, 1928. Serial No. 310,334.

This invention relates to certain new and useful improvements in pot heads and refers more particularly to pot heads of that type into which a plurality of cables are brought to have their ends brought outwardly of the pot head and connected with lead in conductors or the like in any suitable manner and contemplates as an object the provision of means for hermetically sealing the inlet of the pot head about the several cables.

Another object of this invention resides in the provision of a single seal for the plurality of separate cables entering the pot head which is tightened by a single clamping means.

A further object of this invention resides in the provision of a stuffing box or packing for the inlet of a pot head through which a plurality of cables extend which is formed of metal to provide means for grounding the cable sheaths.

And a still further object of this invention resides in the provision of a stuffing box having a plurality of apertures through which the cables extend into the pot head and having its outer wall tapered whereby a pressure exerted on the stuffing box or packing member securely grips the lead sheaths of the cables.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which.

Figure 1:
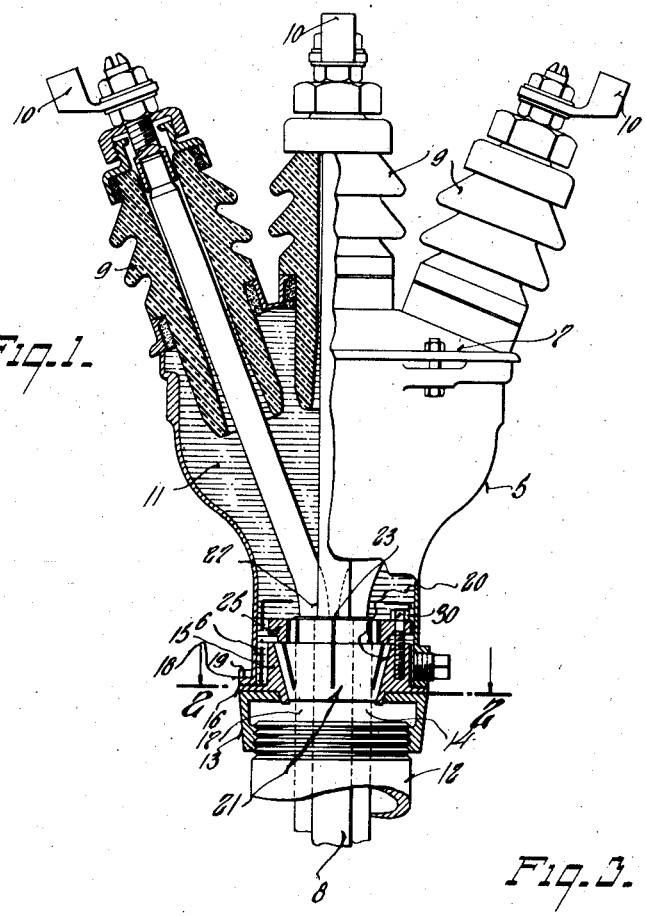
Figure 1 is an elevational view of a pot head embodying my invention, parts thereof being in section to illustrate structural details.
Figure 2:
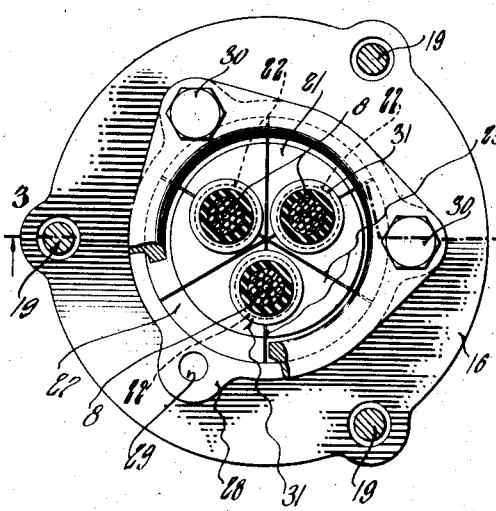
Figure 2 is a cross sectional view taken through Figure 1 on the plane of the line 2—2.
Figure 3:
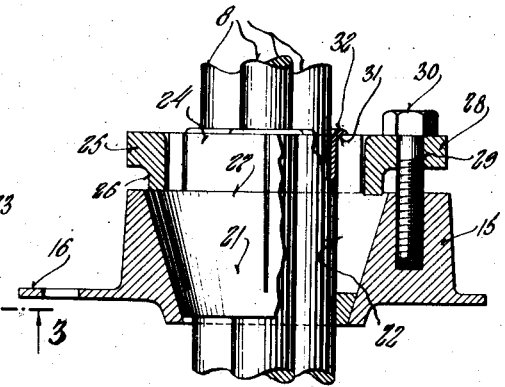
Figure 3 is a sectional view taken through Figure 2 on the plane of the line 3—3.

Referring now more particularly to the accompanying drawing, in which like numerals designate like parts throughout the several views, 5 designates the casing of a pot head of conventional design having an inlet 6 at its lower portion and having a cover member 7 closing its open top. In the present instance, three cables 8 enter the inlet 6 of the pot head and are fanned outwardly through insulator bushings 9 to have terminal members 10 connected with their outer ends in a conventional manner. As is customary, the interior of the pot head is filled with a suitable moisture proof and insulating compound 11.

The pot head structure is adapted to be supported by a suitable metal conduit 12 through which the cables 8 extend upwardly to the pot head, the connection between the metal conduit 12 and the casing 5 comprising a cap member 13 threaded on the upper end of the conduit and having an aperture 14 in axial alignment with the conduit through which the cables 8 extend. A sleeve member 15, having a peripheral flange 16, is positioned above the cap 13 with its flange resting on the face of the cap and having a downwardly extending annular bead 17 which extends into the aperture 14 of the cap member to maintain the sleeve 15 in axial alignment therewith. The flange 16 of the sleeve is positioned between the top of the cap 13 and a flange 18 formed on the lower end of the casing 5 where it is impinged by clamping screws 19, passing through aligned apertures in the flanges 18 and 16 and being threaded in the cap 13.

The sleeve 13 is further provided with an inwardly and downwardly tapered bore 20, the smallest diameter of which is sufficiently large to permit the several cables 8 to pass therethrough and in which a bushing member 21 is positioned. The bushing member 21 has its major portion tapered to correspond to the tapered bore 20 and is preferably formed of a substantially soft metal such as lead or the like and has three longitudinal apertures 22 through which the cables 8 pass. The apertures 22 are arranged symmetrically about the axis of the bushing member 21 and radial slots 23 divide the bushings into six small segments, each aperture being intersected by one of the slots. The slots 23, however, do not extend throughout the entire depth of the bushing member 21 but terminate short of its lower face to provide a solid bottom.

The upper portion of the bushing 21 is reduced to provide a boss 24 about which a clamping ring 25 is positioned, the ring having a downwardly extending reduced portion 26 which engages the wall 27 extending between the boss 24 and the upper periphery of the tapered portion of bushing 21. Ears 28 are extended from the clamping ring 25 at equally spaced intervals and are provided with apertures 29 through which clamping screws 30 pass to be threaded in the sleeve 15 so that as the screws 30 are drawn down pressure is imposed on the tapered portion of the bushing 21 causing the several segments formed by the several intersecting radial slots 23 to clamp the lead sheath of the cables 8 passing through the apertures 22. In this manner the cables entering the pot head are firmly gripped and held in position and as the radial slots 23 do not extend throughout the entire depth of the bushing member 21, the unbroken portion at the bottom thereof provides a hermetic seal completely closing the inlet to the pot head.

The upper outer ends of the apertures 22 are preferably rounded, as at 31, and the lead sheaths of the cables are stripped back to a point substantially adjacent the rounded portion 31 and pressed thereover, as at 32, thus further preventing longitudinal movement of the cables with respect to the bushing.

From the foregoing description taken in connection with the accompanying drawing, it will be readily apparent to those skilled in the art to which an invention of this character appertains that I provide novel means for anchoring or securing a plurality of cables within the entrance of a pot head in a simple and efficient manner.

What I claim as my invention is:

1. In combination with a pot head, having a tapered opening in one wall to form an inlet through which a plurality of cables extend, a member formed of deformable metal received in said tapered opening and having a plurality of bores through which the cables pass, said cables having a substantially snug fit in their respective bores, and means for forcing the member of deformable metal into the tapered opening to cause the same to grip and anchor the several cables.

2. In combination with a pot head, having a tapered opening in one wall to provide an inlet through which a plurality of cables extend, a bushing member of deformable metal tapered to correspond to the tapered opening and received therein, said bushing member having transverse slots extending throughout substantially the entire depth thereof to divide the same into substantially separated sections, said bushing member also having spaced bores extending therethrough and arranged with their axes in the planes of the slots and adapted to receive the cables, and means for forcing the bushing member into the tapered opening to force its sections together to clamp the cables in their respective bores, the portions of the bushing connecting the sections being disposed in the tapered opening whereby said portions are compressed between adjacent cables and the wall of the tapered opening.

3. In a device of the character described, a member having a tapered opening, a bushing member formed of deformable metal and substantially wedge shaped to conform to the tapered opening in which it is received, said bushing member having a plurality of radial slots extending throughout substantially the depth thereof and dividing the same into a plurality of substantially separated sections, the bushing member also having a plurality of longitudinal bores extending therethrough and positioned with their axes in the planes of the radial slots for the reception of the cables, the cables having a substantially snug engagement in their respective bores, and means for forcing the bushing member into the tapered opening to cause its sections to be forced toward each other to thereby securely anchor the cables with respect thereto.

4. In combination with a pot head having a tapered opening in one wall to provide an inlet adapted to receive a plurality of cables, a bushing of deformable metal in the tapered opening and provided with a plurality of longitudinal bores, each having a cable received therein, said bushing also having radial slots extending longitudinally for the major portion of the bushing depth to divide the same into connected section, and means for drawing the bushing into the tapered opening to force the sections towards each other and clamp the cables in their respective bores.

In testimony whereof I have hereunto affixed my signature.

ALWIN G. STEINMAYER.